Figure 1:
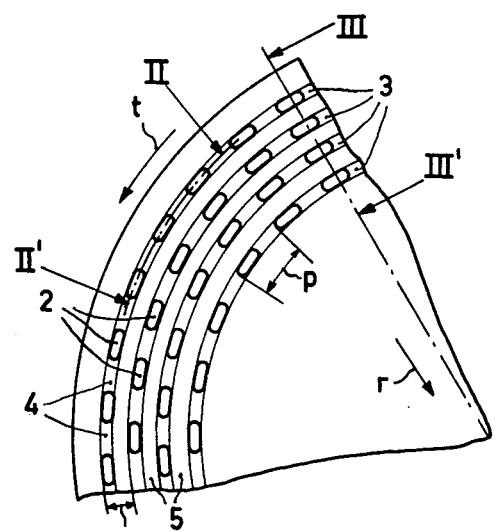

United States Patent [19]

Dil

[11] 4,209,804
[45] Jun. 24, 1980

[54] RECORD CARRIER CONTAINING INFORMATION IN AN OPTICALLY READABLE RADIATION REFLECTING INFORMATION STRUCTURE

[75] Inventor: Jan G. Dil, Eindhoven, Netherlands

[73] Assignee: U.S. Philips Corporation, New York, N.Y.

[21] Appl. No.: 8,133

[22] Filed: Jan. 31, 1979

[30] Foreign Application Priority Data

Oct. 19, 1978 [NL] Netherlands ............ 7810462

[51] Int. Cl.² .................... H04N 5/76; G06K 19/06
[52] U.S. Cl. ....................... 358/128.5; 235/487; 179/100.3 V
[58] Field of Search ................ 358/127, 128

[56] References Cited

U.S. PATENT DOCUMENTS

| | | | |
|---|---|---|---|
| 3,962,720 | 6/1976 | Braat | 358/128 |
| 4,094,013 | 6/1978 | Hill et al. | 358/128 |
| 4,161,752 | 7/1979 | Basilico | 358/128 |

OTHER PUBLICATIONS

"Simplified Diffraction Theory of the Video Disk," Applied Optics, vol. 17, No. 13, Jul. 1978, pp. 2037–2042.

Primary Examiner—Daryl W. Cook
Attorney, Agent, or Firm—Thomas A. Briody; William J. Streeter; Simon L. Cohen

[57] ABSTRACT

A record carrier is described having an optically readable radiation-reflecting information structure, comprising information areas arranged in information tracks, which areas are spaced from each other by intermediate areas, the information areas having oblique walls. It is demonstrated that a suitable information signal and a suitable positional error signal are obtained if the angle of inclination of the walls of the information area lies between 65° and 85° and the phase depth of the information areas lies between 95° and 140°.

8 Claims, 10 Drawing Figures

RECORD CARRIER CONTAINING INFORMATION IN AN OPTICALLY READABLE RADIATION REFLECTING INFORMATION STRUCTURE

The invention relates to a record carrier containing information in an optically readable radiation-reflecting information structure comprising information areas, which are arranged in information tracks, which are spaced from each other in the track direction by intermediate areas, and which have a phase depth which is substantially constant over the entire record carrier.

An optical record carrier, especially as a medium for the dissemination of a (color) television program, is inter alia described in the article: "Simplified diffraction theory of the video disk" in: "Applied Optics," Vol. 17, No. 13, July 1978, pages 2037–2042. During reading the information structure is illuminated with a read beam which by means of an objective system is focussed on the information structure to a read spot of the order of magnitude of the information areas. In the path of the read beam which has been modulated by the information structure there is arranged a radiation sensitive information detection system, whose output signal varies in accordance with the portion of the information structure being read instantaneously. As is described in the said article, the information structure may be regarded as a diffraction grating which splits the read beam into a plurality of spectral orders, to which orders a specific phase and amplitude may be attributed. For reading the information mainly the zero order subbeam and the first order subbeams, which are diffracted in the track direction, area of interest. The first order subbeams interfere with the zero order subbeam at the location of the information detection system. Use can be made of so-called "push-pull" detection i.e. the difference between the output signals of two detectors is determined. These detectors are then disposed in the far field of the information structure, behind each other viewed in the track direction. The difference signal of the two detectors is then determined by the information being read instantaneously.

According to the afore-mentioned article the difference signal, or information signal, is optimum, i.e. the signal has a maximum modulation depth, if the phase difference between a beam portion coming from an information area and the beam portion coming from the surrounding of said area is 90°. This means that for a record carrier which is read in transmission the optical depth of the information areas should be $\frac{1}{4}\lambda$eff, where $\lambda$eff is the wavelength at the location of the information structure. The information structure is preferably a reflecting structure. In that case the information areas should have an optical depth equal to $\frac{1}{8}\lambda$eff for an optimum reading by push-pull detection. It is then assumed that the walls of the information areas are perpendicular, or in other words that the angle of inclination of these walls is 0°. The angle of inclination is to be understood to mean the acute angle between the walls and a normal to the plane of the information structure.

For some time the applicant has been using the concept of "phase depth" for the information structure. This phase depth is defined as the difference between the zero spectral order phase and one of the first spectral order phases, if the center of the read spot coincides with the center of an information area. In general this phase depth differs from the phase difference defined in the afore-mentioned article. Only if the phase difference is 180° at the angle of inclination of the information areas is 0°, the phase difference approximates the phase depth. For an angle of inclination of 0° a phase difference of 90° does not correspond to a phase depth of 90°, but depending on inter alia the width of the information areas, to a phase depth of for example 115°. For a structure with oblique walls the concept of phase difference can in fact no longer be used.

According to the method of recording now preferred a photoresist layer deposited on a substrate is exposed to an optical write beam whose intensity is switched between a high and a low level in accordance with the information to be written. After exposure the photoresist is developed, pits being formed at the locations which have been exposed to a high intensity. From a so-called "master" thus obtained a large number of copies can be manufactured with the aid of techniques known from the manufacture of audio discs. When information is recorded in a photoresist layer whose thickness is substantially greater than the depth of the information areas in the final information carrier, information areas with the said small phase depth can only be realized with large angles of inclination of the walls.

It is an object of the present invention to provide a record carrier whose information-area walls have a substantial angle of inclination, which can be read in an optimum manner with the aid of the radiation sources which are used most frequently in practice, namely a helium-neon gas laser and an AlGaAs diode laser.

The record carrier in accordance with the invention is characterized in that the cross-section, transverse to the track direction, of the information areas is substantially V-shaped, that the phase depth of the information areas has one value between 100° and 125°, and that the angle of inclination between the walls of the information areas and the normal to the record carrier is substantially constant and has a value between 65° and 85°.

The information areas may consist of pits pressed into the record carrier surface or of hills projecting from the record carrier surface.

In theory the information areas may have a V-shape with acute angles. However, in practice the information area will be more gradual pits or hills. These information areas have no flat bottom or top, as the information areas of the record carrier described in the article: "Simplified diffraction theory of the video disk." The phase depth of the information areas in the record carrier in accordance with the invention is mainly determined by the wall steepness of said areas. For angles of inclination of the order of magnitude of 65° to 85° the phase depth of the information areas is preferably 110°. For a specific angle of inclination and a specific width of the information areas, measured transversely to the track direction, the average geometrical depth of a pit or the average geometrical height of a hill has a fixed value. The optical depth corresponding to this average geometrical depth is always smaller than $\frac{1}{8}\lambda$eff, the optical depth being for example 1/10 $\lambda$eff. The optimum value, within the said limits, of the angle of inclination depends on the read beam used, specifically the wavelength of said beam in relation to the width of the information areas and, to a smaller extent, on the state of polarization of said beam.

A record carrier in accordance with the invention which is adapted to be read with a read beam produced by a helium-neon gas laser and having a wavelength of approximately 633 nm, in which record carrier the width, transverse to the track direction, of the information areas is approximately 625 nm, is characterized in that the angle of inclination of the information areas is approximately 78°.

A record carrier in accordance with the invention is adapted to be read with a read beam produced by an AlGaAs diode laser with a wavelength in the range of 780–860 nm, and with a direction of polarization parallel to the track direction, in which record carrier the width, transverse to the track direction, of the information areas is approximately 625 nm, is characterized in that the angle of inclination of the information areas is approximately 73°.

If a read beam is used whose wavelength lies between 633 nm and 780 nm, the optimum value of the angle of inclination lies between 73° and 78°. For a read beam with a wavelength smaller than 633 nm the optimum angle of inclination has a value between 78° and 85°.

The invention is particularly suitable for use in a record carrier in which apart from shallow phase structures, to be read in push-pull, contains also deeper phase structures to be read by the so-called "central aperture" method. For the central aperture method the information is read by detecting the sum of all the radiation intensity passing through the exit pupil of the objective system. When a record carrier is to be provided with both a deeper and a more shallow phase structure, the more shallow phase structure can be realized almost only with large angles of inclination by means of the write method now preferred. Two types of information areas in one record carrier may for example be used in order to obtain a high information density, as is described in U.S. patent application Ser. No. 925,433, filed July 18, 1978. If in such a record carrier use is made of the concept underlying the invention, said record carrier is characterized in that between first information tracks containing information areas with a phase depth between 100° and 110° second information tracks are formed which contain information areas whose phase depth is approximately 180°.

The present invention cannot only be used in a record carrier which is completely provided with information but also in a record carrier in which information can be written by the user himself. In such a record carrier the information is address information contained in so-called sector addresses, each track containing a specific number of such addresses. The sector addresses occupy only a small part of the tracks. The track portions between the sector addresses are of an inscribable material, for example a thin metallic layer, in which the user can then record information with the aid of for example a laser beam, for example by locally melting the metal. A sector address contains address information of the associated inscribable track portion in the form of address areas which are spaced from each other by intermediate areas. According to the invention the address areas have a substantially V-shaped cross-section, a phase depth between 100° and 125°, and an angle of inclination between 65° and 85°.

Figure 2:
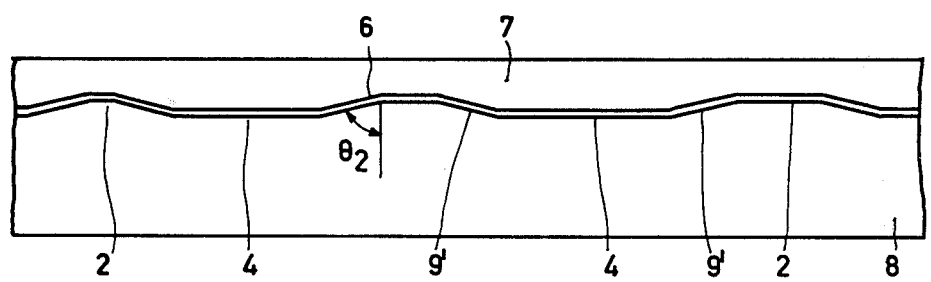
Figure 3:
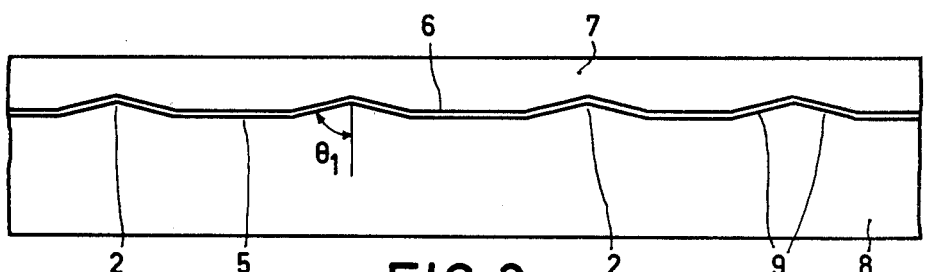
Figure 4:
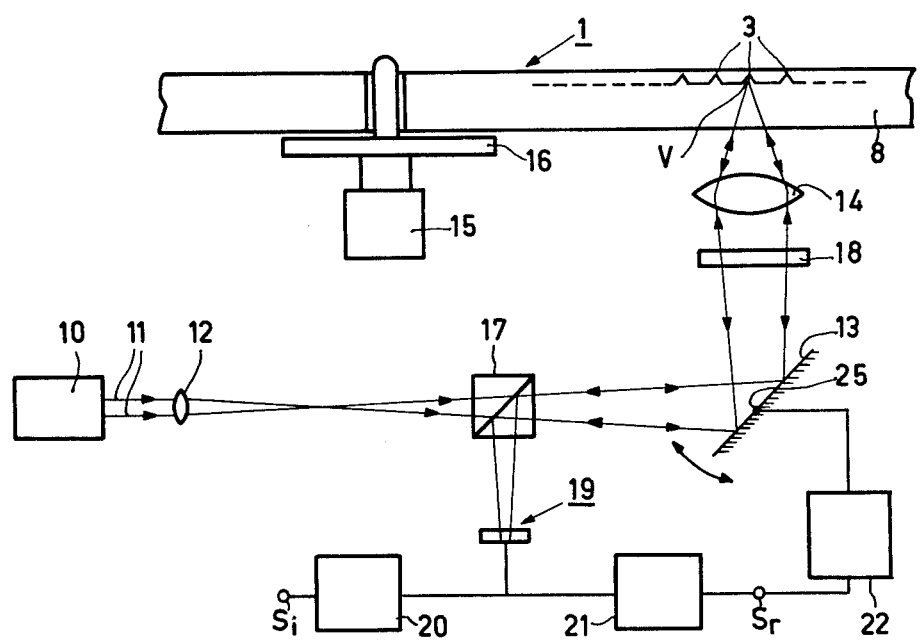
Figure 5:
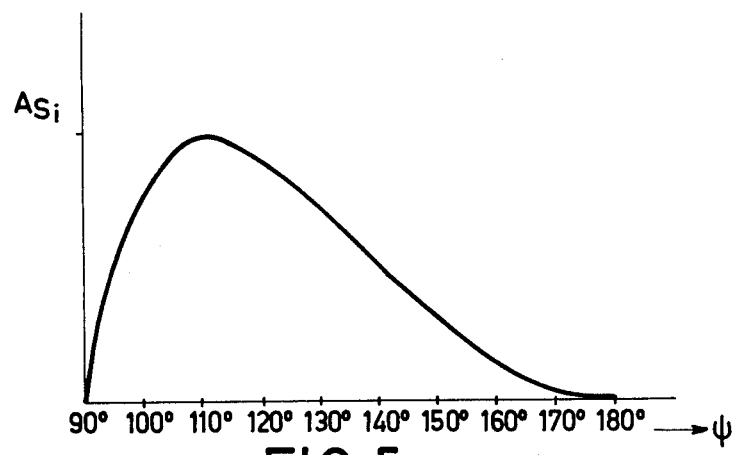
Figure 6:
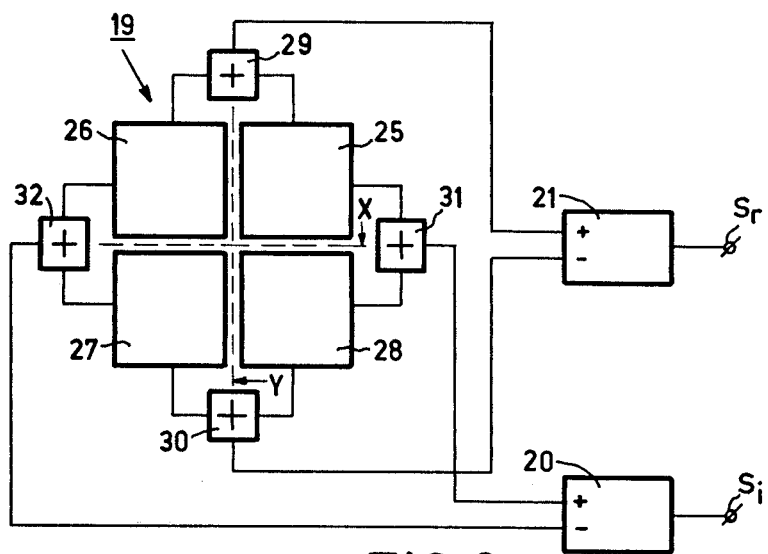
Figure 10:
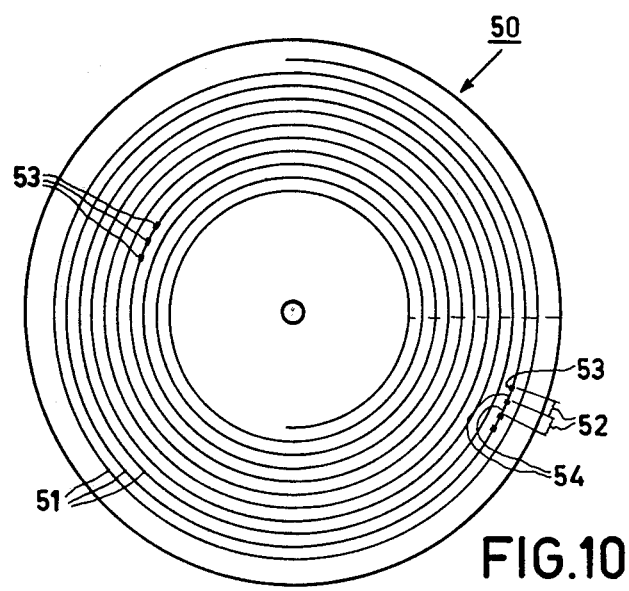
Figure 7:
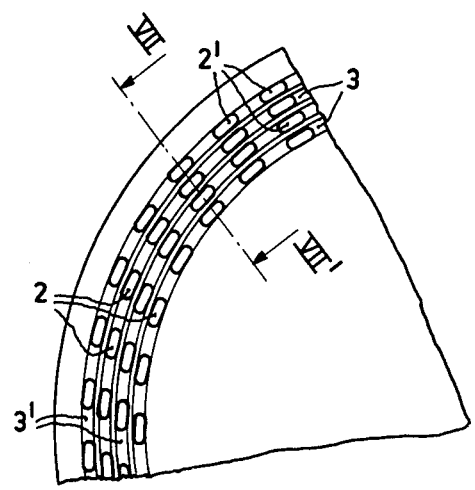
Figure 8:
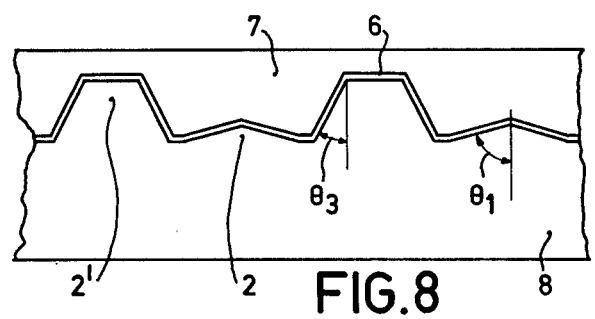
Figure 9:
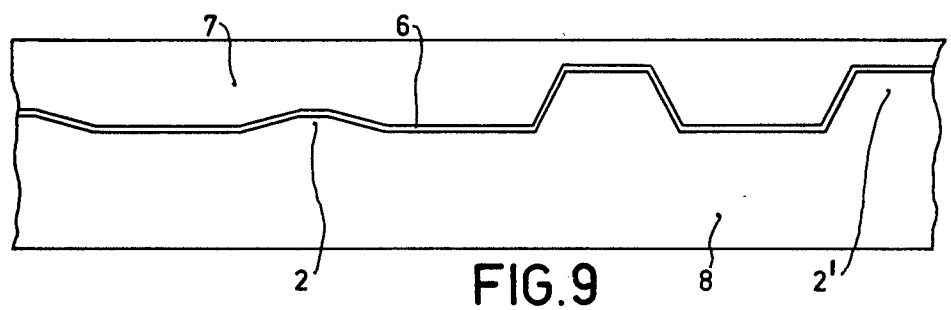

The invention will now be described in more detail with reference to the drawing. In this drawing:

FIG. 1 shows a part of an information structure of a round disc-shaped record carrier, FIG. 2 shows a part of a tangential cross-section of a record carrier in accordance with the invention FIG. 3 shows a part of a radial cross-section of this record carrier, FIG. 4 shows a known apparatus for reading the record carrier, FIG. 5 shows the variation of the amplitude of the information signal as a function of the phase depth, FIG. 6 shows a composite detection system and the block diagram of an associated processing circuit by means of which, in addition to an information signal, a positional error signal can be obtained, FIG. 7 shows a part of a record carrier in accordance with the invention, containing information tracks with a greater phase depth and information tracks with a smaller phase depth, FIG. 8 shows a part of a radial cross-section of this record carrier, FIG. 9 shows a part of a tangential cross-section or a record carrier in accordance with the invention which within a track comprising track portions with a greater phase depth and track portions with a smaller phase depth, FIG. 10 shows a record carrier in accordance with the invention in which information can be recorded by a user.

As is shown in FIG. 1 the information structure comprises a number of information areas 2, which are arranged in accordance with information tracks 3. In the track direction or tangential direction t the information areas are spaced from each other by intermediate areas 4. In the radial direction r the information areas are spaced from each other by lands 5. The information areas may comprise pits pressed into the record carrier surface or hills projecting from the record carrier surface. In principle the depth of the pits, or the height of the hills is constant, and so is the width of the information areas and intermediate areas at the level of the plane of the lands. The said distance and the said width are not determined by the information which is stored in the structure.

The information to be conveyed by means of the record carrier is contained in the variation of the structure of areas in the tangential direction only. If a color television program is stored in the record carrier, the luminance signal may be coded in the variation of the spatial frequency of the information areas 2 and the chrominance and audio signal in the variation of the lengths of the areas 2. Instead of a television program the record carrier may contain an audio program. The information may also be digital information. In that case a specific combination of information areas 2 and intermediate areas 4 represents a specific combination of digital ones and zeros.

Such a record carrier with a radiation reflecting information structure can be read with an apparatus which is schematically represented in FIG. 4. A monochromatic and linearly polarized beam 11 emitted by a gas laser 10, for example a helium-neon laser, is reflected to an objective system 14 by a mirror 13. In the path of the radiation beam 11 there is arranged an auxiliary lens 12 which ensures that the pupil of the objective system 14 is filled. On the information structure a diffraction-limited read spot V is then formed. The information structure is schematically represented by the tracks 3; i.e. the record carrier is shown in radial cross-section.

The information structure may be disposed on the record carrier side which faces the laser. However, preferably, as is shown in FIG. 4, the information structure is disposed on the record carrier side which faces away from the laser, so that the record carrier is read through the transparent substrate 8. The advantage of this is that the information structure is protected against fingerprints, dust particles, and scratches.

The read beam 11 is reflected by the information structure and as the record carrier is rotated by means of a platter 16 which is driven by a motor 15, it is modulated in accordance with the sequence of the information areas and the intermediate areas 4 in a track being read. The modulated read beam again passes through the objective system 14 and is reflected by the mirror 13. In order to separate the modulated read beam from the unmodulated read beam the radiation path preferably incluides a polarization-sensitive splitter prism 17 and a $\lambda_o/4$ plate 18, where $\lambda_o$ represents the wavelength of the read beam in free space. The beam 11 is transmitted by the prism 17 to the $\lambda_o/4$ plate 18, which converts the linearly polarized radiation into circularly polarized radiation which is incident on the information structure. The reflected read beam again passes through the $\lambda_o/4$ plate 18, the circularly polarized radiation beam being converted into linearly polarized radiation whose plane of polarization is rotated through 90° relative to the radiation emitted by the laser 10. Thus, upon the second passage the read beam will be reflected by the prism 17, namely to a radiation-sensitive detection system 19.

For reading the information thee detection system should comprise two detectors which are arranged behind each other in the effective track direction. The output signals of the detector are subtracted from each other in a circuit which is schematically represented by the block 20 in FIG. 4. The output signal $S_i$ is determined by the sequency of information areas and intermediate areas in the track portion being read instantaneously. After decoding, this signal is displayed on a television set if the record carrier contains a television program, or is reproduced with known audio equipment if an audio program has been recorded on a record carrier.

As stated in the previously mentioned article: "Simplified diffraction theory of the video disk," the phase difference between a beam portion coming from an information area and a beam portion coming from the vicinity of said area should be 90° for an optimum signal $S_i$ in the case that the walls of the information areas are perpendicular. The phase difference of 90° corresponds to a phase depth of for example 115°.

In a record carrier in accordance with the invention the information areas have oblique walls, as is shown in FIGS. 2 and 3. The concept of phase difference can then no longer be used and the concept of phase depth is to be adopted. FIG. 2 shows a small part of the record carrier in accordance with the invention in tangential cross-section taken on the line II—II' in FIG. 1, while FIG. 3 shows a small part of this record carrier in radial cross-section, taken on the line III—III' in FIG. 1. During reading the record carrier is illuminated from the underside, the transparent substrate 8 being used as an optical protective layer. The information structure may be covered with a layer 6 of a reflecting material, such as silver or aluminium or titanium. Onto the layer 6 another protective layer 7 may be deposited, which protects the information structure against mechanical damage such as scratches. FIG. 3 furthermore shows the angle of inclination $\theta$ of the radial walls 9 of the information areas, i.e. of the transitions from information areas to lands. The angle of inclination $\theta_2$ of the tangential walls 9' of the information areas, i.e. of the transitions from information areas to intermediate areas, shown in FIG. 2 is of the same order of magnitude as $\theta_1$. As in general the length of the information areas is greater than their width, these areas have straight portions in the cross-section of FIG. 2.

Calculations and experiments conducted by the applicant have demonstrated that the write process and the copying process are reproducible in an optimum manner if the angle of inclination $\theta_1$ has a value between 65° and 85°. Furthermore it has been found that, within these limits for the angle of inclination $\theta_1$, the optimum phase depth is approximately 110°. FIG. 5 represents the variation of the amplitude $A_{Si}$ of the information signal $S_i$ as a function of the phase depth $\Psi$. For a phase depth $\Psi = 180°$ the energy distribution within the exit pupil of the objective system 14 is symmetrical, so that the difference signal from the detectors is zero. A phase depth $\Psi = 90°$ means that the information structure is very shallow. The amplitude of the spectral first orders is then approximately zero. Consequently the amplitude $A_{Si}$ is also zero for $\Psi = 90°$. FIG. 5 also reveals that the phase depth $\Psi = 110°$ is the optimum value, but that also at deviating values an acceptable information signal $S_i$ can be obtained. For $\Psi = 100°$ and $\Psi = 125°$ the amplitude of the signal $S_i$ is still approximately 80° of the optimum value, so that information areas with a phase depth of 100° to 125° can be read reasonably.

The phase depths plotted along the horizontal axis of FIG. 5 result from different geometries of the information areas, specifically from different values of the wall steepness of these areas. The wall steepness is determined by the intensity of the write beam which is used and by the developing process.

The Applicant has come to recognize that apart from by the angle of inclination $\theta_1$ of the walls of these areas, the observed phase depth of the information areas is determined by:

the effective wavelength of the read beam in relation to the maximum width of the information areas, and the state of polarization of the read beam. The effective wavelength is the wavelength near the information structure and outside the radiation reflecting layer. In the case shown in FIGS. 1, 2 and 3 the effective wavelength is equal to the wavelength in free space divided by the refractive index (N) of the substrate 8.

In the case of V-shaped information areas the wall steepness determines the effective depth of said areas.

According as the wavelength of the read beam increases, the effective depth and thus the wall steepness of the information areas should be increased in order to obtain a specific phase depth.

For read out with a HeNe read beam the optimum phase depth $\Psi = 110°$ is obtained for an angle of inclination of 78° and for read out with an AlGaAs read beam for an angle of inclination of 73°. If the average spatial frequency of the information areas varies over the record carrier, for example if on a record carrier with a television program one television picture per revolution is stored, the wall steepness may be increased at greater average spatial frequency of the information areas in order to obtain an optimum information signal over the entire record carrier.

In general can be stated that when a perpendicularly polarized read beam is used an elongate pit or hill generally appears to be deeper or higher than when a parallel polarized read beam is used. A perpendicularly polarized or parallel polarized read beam is to be understood to mean a read beam whose electrical vector, the E-vector, is respectively perpendicular or parallel to the longitudinal direction of the pits or hills.

When a He-Ne laser source is used and when an AlGaAs diode laser is used the said polarization effect occurs. When reading by means of a HeNe laser, as is described with reference to FIG. 4, a circularly polarized read beam is incident on the information structure. A diode laser emits linearly polarized radiation. When a diode laser is used in a read apparatus use can be made of the so-called "feedback," the diode laser being employed as detector. In that case no polarization means need be included in the radiation path, as in the apparatus in accordance with FIG. 4, and the information structure is scanned with linearly polarized radiation. If the read beam is perpendicularly polarized, the information areas should have a greater angle of inclination in order to obtain a phase depth of 110°, than if the read beam is parallel or circularly polarized. In the case of a perpendicularly polarized read beam the observed phase depth increases more rapidly at decreasing angle of inclination than in the case of a parallel or circularly polarized read beam. Preferably, reading is effected with a parallel polarized beam, because the angle of inclination is then less critical.

When reading the record carrier care must be taken that the center of the read spot always remains positioned on the center of a track to be read. For this purpose a positional error signal should be generated, which provides an indication about the magnitude and direction of a possible deviation from the center of the read spot relative to the track center. This positional error signal can be obtained with the aid of two detectors which, in the direction transverse to the effective track direction, are offset relative to each other. The output signals of these detectors are applied to a subtractor circuit, 21 in FIG. 4. The output signal $S_r$ of this circuit then constitutes the positional error signal. This signal can be processed in the circuit 22, known per se, into a control signal for correcting the position of the read spot, for example by tilting the mirror 13 about the axis 25.

The record carrier in accordance with the invention whose information structure has been optimized for information read out is also correctly dimensioned for generating an optimum positional error signal. This is because the positional error signal is also obtained by push-pull reading, but now in a direction transverse to the track direction. In the previously mentioned article: "Simplified diffraction theory of the video disk" it has been demonstrated that in the case of push-pull reading of information areas with perpendicular walls both the information signal and the positional error signal are optimum for a phase difference of 90°. In a similar way both the information signal and the positional error signal are optimum for a phase depth of $\Psi=110°$ when information areas with oblique walls are read in push-pull.

A known detection system, by means of which both an information signal and a positional error signal can be obtained, is shown in FIG. 6. The detection system comprises four detectors 25, 26, 27 and 28, which are disposed in four different quadrants of an imaginary X-Y coordinate system. The X-axis and the Y-axis are effectively parallel to the track direction t and the radial direction r respectively (compare FIG. 1). The output signals of the detectors 25 and 26 are applied to the summing device 29, and the output signals of the detectors 27 and 28 to a summing device 30. The signals supplied by these summing devices are applied to a differential amplifier 21, on whose output the positional error signal $S_r$ is available. The information is read by applying the output signals of the summing devices 31 and 32, whose inputs are connected to the detectors 25, 28, and 26, 27 respectively, to a differential amplifier 20. The information signal $S_i$ is available on the output of this amplifier. It has already been proposed in the previous patent application Ser. No. 925,433, filed July 18, 1978 in order to increase the information density, to insert second information tracks whose information areas have a smaller phase depth between first information tracks whose information areas have a phase depth of approximately 180°. By reading the first information tracks in the central aperture mode and the second information tracks in the push-pull mode, little crosstalk between the two types of information tracks will occur during reading. Furthermore, consecutive track portions within one tack may also be distinguished from each other in that a first track portion contains information areas having a phase depth of approximately 180° and a subsequent track portion information areas with a smaller phase depth.

In accordance with the invention the information areas with the smaller phase depth may have a V-shape with an angle of inclination between 65° and 85°.

FIG. 7 shows a part of such a record carrier. In addition to information tracks 3 comprising information areas 2 of smaller phase depth there are information tracks 3' comprising information areas 2' of greater phase depth. The distance between the track 3 and the track 3' is smaller than the distance between two tracks 3 in FIG. 1.

FIG. 8 shows a radial cross-section taken on the line VIII—VIII' in FIG. 7. FIG. 8 partly corresponds to FIG. 3. In FIG. 8 information areas 2' are situated at the locations of the lands 5 in FIG. 3. These information areas preferably also have oblique walls whose angle of inclination $\theta_3$ lies between 30° and 60°. The geometrical structure of the information areas 2' has been described elsewhere, namely in another patent application Ser. No. 972,754, filed Dec. 26, 1978.

At a phase depth of 110° of the information areas 2 an optimum information signal is obtained from the areas in the case of push-pull reading. However, a phase depth of 110° also results in an appreciable signal in the case of central aperture reading, which is use for reading in the information areas 2'. Preferably, the phase depth of the information areas 2 is selected near 100°. The push-pull signal from the information areas 2 is then still large, while in the case of central aperture reading of the information areas 2' the information areas 2 are hardly detected.

FIG. 9 shows a tangential cross-section of a record carrier which within a track comprises track portions of a smaller phase depth alternating with track portions of a larger phase depth, the cross-section representing a transition from a first track portion to a second track portion. After the foregoing this figure is self-explanatory.

In for example the previous application Ser. No. 925,229, filed July 18, 1978, it has already been proposed to employ an optical record carrier as a storage medium for information other than video information, especially as a storage medium in which information can be recorded by the user himself. Examples of this are information supplied by an (office) computer or radiograms made in a hospital. For this purpose the user is supplied with a record carrier which is provided with a so-called servo-track of for example spiral shape, which extends over the entire record carrier surface.

During the recording of the information by the user the radial position of the write spot relative to the servo track is detected and corrected with the aid of an opto-electronic servo system, so that the information is written with high accuracy in a spiral track of constant pitch. The servo track is divided into a multitude of sectors, for example 128 per revolution. FIG. 10 shows a plan view of such a record carrier 50. The servo track is designated 51 and the sectors 52. Each sector comprises a track portion 54, in which the information may be recorded, and a sector address 53, in which inter alia the address of the associated track portion 54 is encoded in address areas in for example digital form. The address areas are spaced from each other by intermediate areas in the track direction. The address areas may comprise pits pressed into the record carrier surface or hills projecting from said surface.

In accordance with the invention the address areas consist of pits or hills with oblique walls having an angle of inclination between 65° and 85° and these address areas have a phase depth between 100° and 125° in a similar way as described in the foregoing for the information areas in a record carrier with a video program. A tangential cross-section of the sector addresses is then as shown in FIG. 2. Preferably, the sector addresses of all tracks are situated within the same circular sectors. In that case a radial cross-section through the address areas will be as shown in FIG. 3.

The "blank" track portions 54 may comprise continuous grooves on which a layer of a reflecting material is deposited which, if exposed to suitable radiation, is subject to an optically detectable change. The layer for example consists of bismuth in which information areas can be formed by melting.

The "blank" track portions may consist of V-shaped grooves. In order to enable an optimum tracking signal to be obtained from these grooves by push-pull reading during recording, these grooves, as is apparent from the foregoing, should have a phase depth which is approximately 110°. When a record carrier inscribed by the user i.e. a record carrier in which pits have been melted in the V-shaped grooves, is read in the central aperture mode the groove portions between the pits will still produce a small signal, if these groove portions have a phase depth of 110°. Therefore, the phase depth of the blank grooves is preferably 100°, so that during central aperture reading of the inscribed record carrier these grooves are hardly detected anymore.

The invention has been described on the basis of a round disc-shaped record carrier. However, the invention may also be used for other record carriers, such as tapelike or cylindrical record carriers, which contain information in a phase structure.

What is claimed is:
1. A record carrier containing information in an optically readable radiation reflecting information structure comprising information areas, which are arranged in information tracks, which are spaced from each other in the track direction by intermediate areas, and which have a phase depth which is substantially constant over the entire record carrier, characterized in that the cross-section, transverse to the track direction, of the information areas is substantially V-shaped, that the phase depth of the information areas has one value between 100° and 125°, and that the angle of inclination between the walls of the information areas and the normal to the record carrier is substantially constant and has a value between 65° and 85°.

2. A record carrier as claimed in claim 1, characterized in that the phase depth is approximately 110°.

3. A record carrier as claimed in claim 2, adapted to be read with a read beam produced by a helium-neon gas laser and having a wavelength of approximately 633 nm, in which record carrier the width, transverse to the track direction, of the information areas is approximately 625 nm, characterized in that the angle of inclination of the information areas is approximately 78°.

4. A record carrier as claimed in claim 2, which is adapted to be read with a read beam produced by an AlGaAs diode laser with a wavelength in the range from 780 to 860 nm and with a direction of polarization parallel to the track direction, in which record carrier the width, transverse to the track direction, of the information areas is approximately 625 nm, characterized in that the angle of inclination of the information areas is approximately 73°.

5. A record carrier as claimed in claim 1, characterized in that between first information tracks containing information areas with a phase depth between 100° and 110° second information tracks are formed which contain information areas whose phase depth is approximately 180°.

6. A record carrier as claimed in claim 1, characterized in that consecutive track portions within a track differ from each other in that they comprise information areas with a phase depth between 100° and 110° and information areas with a phase depth of approximately 180° respectively.

7. A record carrier as claimed in claim 1, in which record carrier in predetermined track portions, information can be written by a user, characterized in that information is contained only in sector addresses in which addresses of associated unrecorded track portions, which contain a material which is inscribable with radiation, area provided, the information areas in the sector addresses having a phase depth between 100° and 110°.

8. A record carrier as claimed in claim 7, characterized in that the unrecorded track portions have a phase depth of approximately 100°.

* * * * *